(12) United States Patent
Liu et al.

(10) Patent No.: US 8,948,972 B2
(45) Date of Patent: Feb. 3, 2015

(54) VEHICLE CONTROLLING SYSTEM AND METHOD

(71) Applicants: Nissan North America, Inc., Franklin, TN (US); The University of Michigan, Ann Arbor, MI (US)

(72) Inventors: Jiechao Liu, Ann Arbor, MI (US); Timothy Gordon, Ann Arbor, MI (US); Ronald Heft, Stafford, VA (US)

(73) Assignees: Nissan North America, Inc., Franklin, TN (US); The University of Michigan, Ann Arbor, MI (US)

( * ) Notice: Subject to any disclaimer, the term of this patent is extended or adjusted under 35 U.S.C. 154(b) by 202 days.

(21) Appl. No.: 13/782,408

(22) Filed: Mar. 1, 2013

(65) Prior Publication Data

US 2014/0249718 A1    Sep. 4, 2014

(51) Int. Cl.
*B62D 5/00* (2006.01)
*G06F 17/00* (2006.01)

(52) U.S. Cl.
CPC ...................................... *G06F 17/00* (2013.01)
USPC ................... 701/41; 701/1; 701/36; 701/301; 702/147; 340/425.5; 340/435; 340/436; 340/576

(58) Field of Classification Search
CPC ...... B62D 5/0463; B62D 7/159; B62D 6/008; B62D 6/003; B60T 8/1755
USPC .......... 701/70, 47, 41, 36, 301, 118; 340/576, 340/436, 435, 425.5; 180/272
See application file for complete search history.

(56) References Cited

U.S. PATENT DOCUMENTS

| | | |
|---|---|---|
| 6,014,595 A | 1/2000 | Kobayashi |
| 7,034,698 B2 | 4/2006 | Matsumoto et al. |
| 7,102,535 B2 | 9/2006 | Otsuka et al. |
| 7,102,539 B2 | 9/2006 | Kawazoe et al. |
| 7,109,850 B2 | 9/2006 | Kawazoe et al. |
| 7,219,031 B2 | 5/2007 | Kawazoe et al. |
| 7,236,884 B2 | 6/2007 | Matsumoto et al. |
| 7,477,978 B2 | 1/2009 | Kawazoe et al. |
| 7,660,669 B2 | 2/2010 | Tsuda |
| 7,680,569 B2 | 3/2010 | Matsumoto et al. |
| 7,698,032 B2 | 4/2010 | Matsumoto et al. |
| 2003/0195667 A1 | 10/2003 | Tange et al. |
| 2007/0225914 A1 | 9/2007 | Kawazoe et al. |
| 2011/0285518 A1 | 11/2011 | Gordon et al. |
| 2012/0033076 A1 | 2/2012 | Nakamura et al. |

FOREIGN PATENT DOCUMENTS

JP    07-160993 A    6/1995

*Primary Examiner* — Helal A Algahaim
*Assistant Examiner* — Jelani Smith
(74) *Attorney, Agent, or Firm* — Global IP Counselors, LLP

(57) ABSTRACT

A vehicle controlling method which includes detecting an engagement of a vehicle tire with a rumble strip of a road, and performing first and second vehicle controls. The first vehicle control includes operating a controller to control movement of the vehicle after the vehicle tire has disengaged from the rumble strip to bring the vehicle tire back into engagement with the rumble strip. The second vehicle control includes operating the controller to continue to control movement of the vehicle to maintain the vehicle tire in engagement with the rumble strip after the vehicle tire has been brought back into engagement with the rumble strip.

20 Claims, 14 Drawing Sheets

US 8,948,972 B2

VEHICLE CONTROLLING SYSTEM AND METHOD

BACKGROUND

1. Field of the Invention

The present invention generally relates to a vehicle controlling system and method. More particularly, the present invention relates to a vehicle controlling system and method that detect an engagement of a vehicle tire with a rumble strip of a road, and perform first and second vehicle controls to bring the vehicle tire back into engagement with the rumble strip and maintain the engagement.

2. Background Information

According to studies performed by the Federal Highway Administration (FHWA), roadway departures are the cause of many vehicle collisions in the United States. Common causes of roadway departure are fatigue, drowsiness or other impairment.

In an attempt to alert drivers that their vehicle is departing from the road, many roads, and especially highways, have been configured with rumble strips that extend in the direction of travel along the outer shoulder of the road. Rumble strips can also be formed along the inner boundary of the road, such as along the shoulder of the road adjacent to a center retaining wall between opposite directions of travel. As known in the art, when a vehicle tire contacts a rumble strip, the contact produces an audible rumbling which can warn a driver that the vehicle is beginning to depart from the road. In this event, the driver can make a suitable correction.

However, if a driver is very drowsy, the audible warning produced by contact of the vehicle tire with the rumble strip may be insufficient to alert the driver. Also, if the driver is unconscious or otherwise incapacitated, the driver may be unable to respond to the audible warning.

Accordingly, a need exists for an improved vehicle controlling system.

SUMMARY

In accordance with one aspect of the present invention, a vehicle controlling method includes detecting an engagement of a vehicle tire with a rumble strip of a road, and performing first and second vehicle controls. The first vehicle control includes operating a controller to control movement of the vehicle after the vehicle tire has disengaged from the rumble strip to bring the vehicle tire back into engagement with the rumble strip. The second vehicle control includes operating the controller to continue to control movement of the vehicle to maintain the vehicle tire in engagement with the rumble strip after the vehicle tire has been brought back into engagement with the rumble strip.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
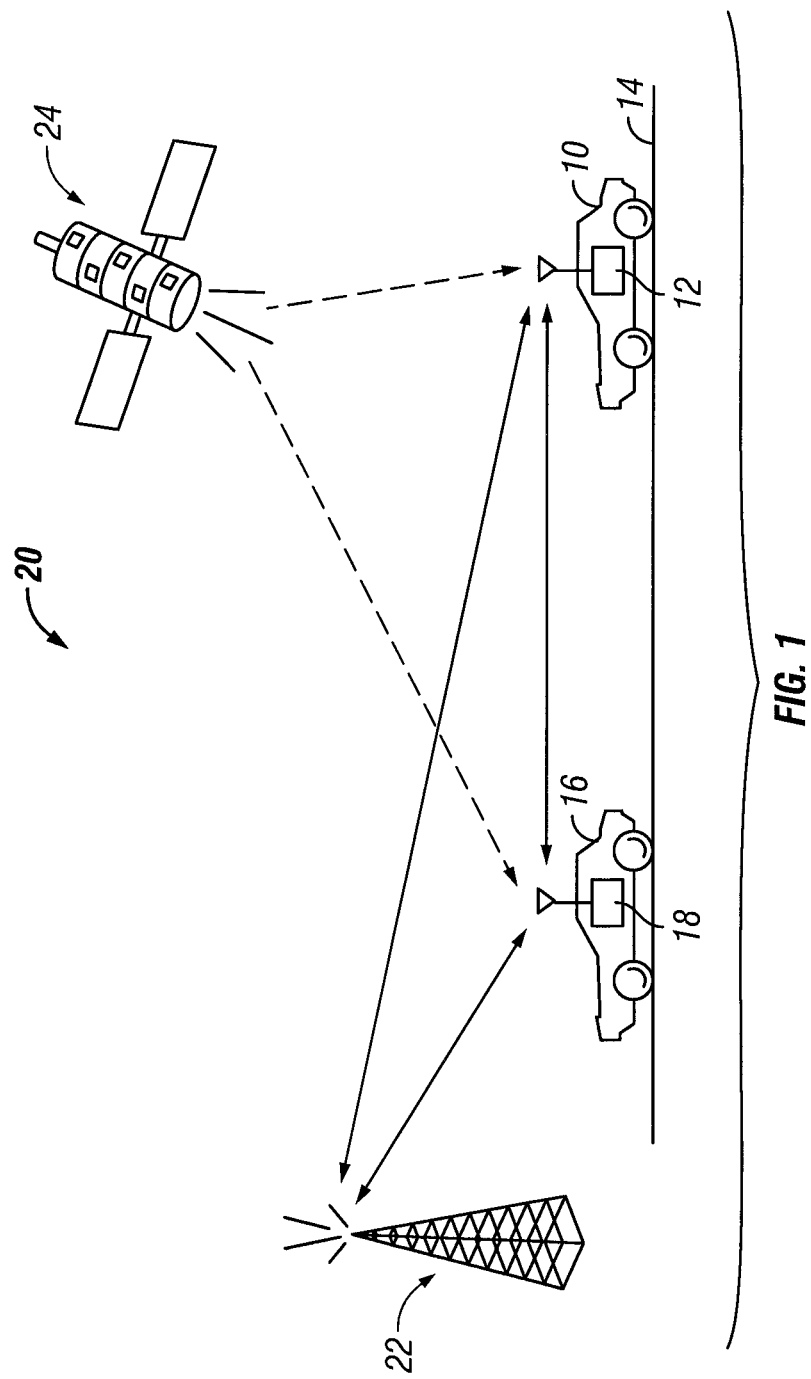
FIG. 1 is a diagrammatic view illustrating an example of a host vehicle equipped with an vehicle controlling system according to a disclosed embodiment traveling on a road along with a neighboring vehicle, and being capable to communicate with the neighboring vehicle, a navigation network and a communication network.
Figure 2:
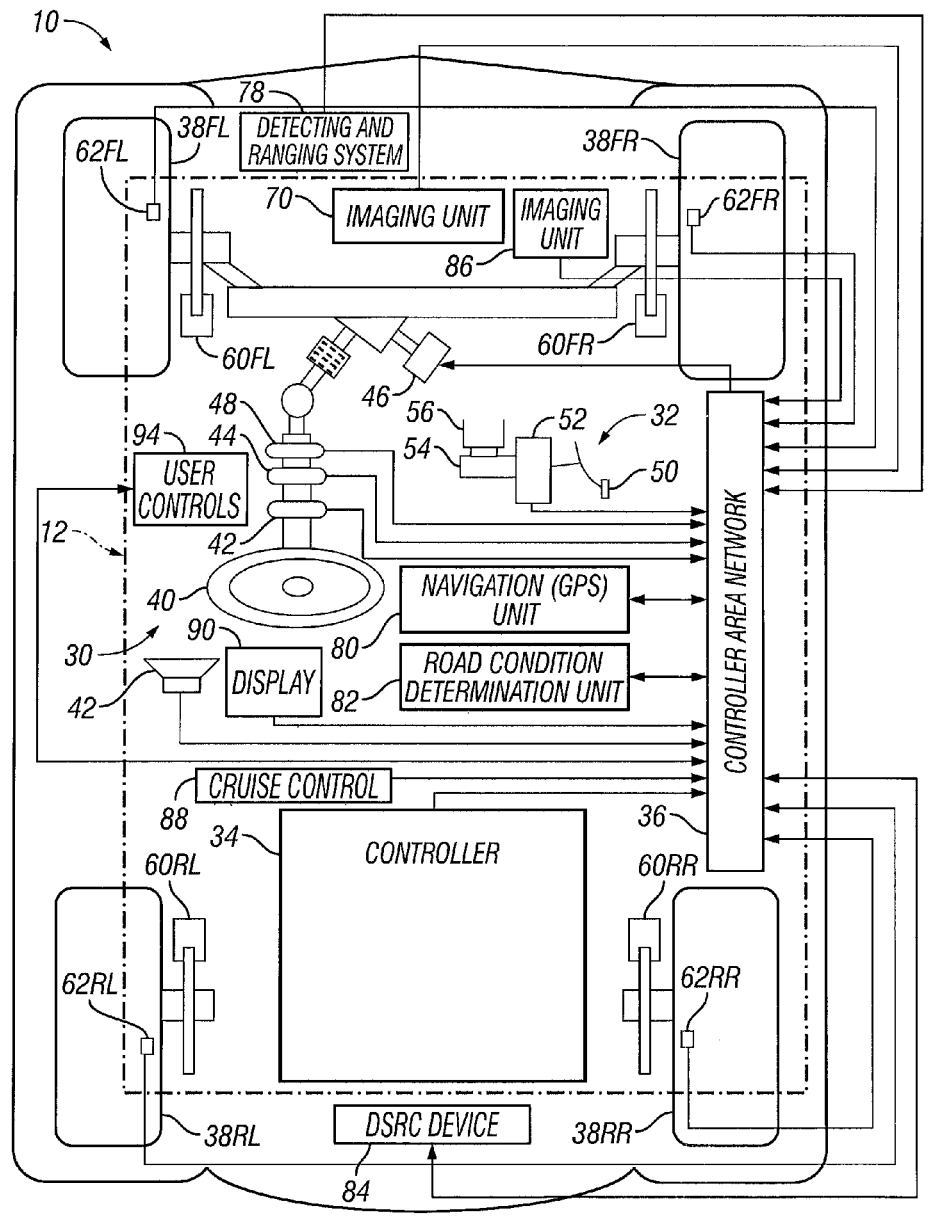
FIG. 2 is a block diagram illustrating an example of a host vehicle equipped with a vehicle controlling system according to a disclosed embodiment.

FIGS. 1 and 2 illustrate an example of a host vehicle 10 equipped with a vehicle controlling system 12 according to a disclosed embodiment. As shown in FIG. 1, the host vehicle 10 is traveling on a road 14. One or more neighboring vehicles 16 can also be traveling on the road 14. The neighboring vehicle 16 can include a communication system 18, which can include a vehicle controlling system 12 as discussed herein, or other types of communication devices that enable the neighboring vehicle 16 to communicate with the vehicle controlling system 12 of the host vehicle 10. Furthermore, as discussed in more detail below, the vehicle controlling system 12 in the host vehicle 10, and the communication system 18 in the neighboring vehicle 16, can communicate with a communication network 20 that can include, for example, terrestrial wireless communication devices 22 such as mobile service communication devices, and satellite communication devices 24 such as satellites in a global positioning system (GPS), as known in the art.

In the diagram of FIG. 2, the host vehicle 10 is basically equipped with a steering system 30, a braking system 32 and an onboard controller 34 that is capable of performing the operations of the embodiments disclosed herein. The controller 34 preferably includes a microcomputer with a control program that controls the components of the vehicle controlling system 12 as discussed below. The controller 34 includes other conventional components such as an input interface circuit, an output interface circuit, and storage devices such as a ROM (Read Only Memory) device and a RAM (Random Access Memory) device. The microcomputer of the controller 34 is at least programmed to control the vehicle controlling system 12 in accordance with the flow chart of FIGS. 5-7 as discussed below. It will be apparent to those skilled in the art from this disclosure that the precise structure and algorithms for the controller 34 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 34 can communicate with the other components of the vehicle controlling system 12 discussed herein in any suitable manner as understood in the art.

The host vehicle 10 can further include, for example, a communication network such as controller area network (CAN) 36 to operatively connect the steering system 30, the braking system 32, the controller 34 and other components as discussed herein. The steering system 30 is thus capable of steering the left front wheel 38FL and the right front wheel 38FR as understood in the art. Also, the braking system 32 is capable of controlling the brakes at the left front wheel 38FL, the right front wheel 38FR, the left rear wheel 38RL and the right rear wheel 38RR as understood in the art. Furthermore, the controller 34 can control the braking system 32 in any manner as understood in the art to control the deceleration of the host vehicle 10 as discussed herein.

As can be appreciated by one skilled in the art, the steering system 30 is preferably a hydraulic operated steering system including, among other things, a steering wheel 40, a torque sensor 42, a steering angle sensor 44, a steering motor 46 and a turn signal switch 48. The torque sensor 42, the steering angle sensor 44, the steering motor 46 and the turn signal switch 48 provide signals to the controller 34 via, for example, the CAN 36 for purposes as discussed herein. Generally, the steering system 30 can be a relatively conventional steering system, and thus, the steering system 30 will not be discussed in further detail herein.

The braking system 32 can be any type of conventional braking system such as a brake-by-wire system including, among other things, a brake pedal 50, a booster 52, a master cylinder 54 and a reservoir 56. In the illustrated embodiment, the braking system 32 is a hydraulically operated braking system that includes a pair of front wheel cylinders 60FL and 60FR and a pair of rear wheel cylinders 60RL and 60RR. The braking system 32 allows independent control of a braking force at the front and rear wheels and the left and right wheels. Generally, the braking system 32 can be a relatively conventional braking system, and thus, the braking system 32 will not be discussed in further detail herein.

In addition, the host vehicle 10 can include a plurality of rumble strip sensing devices or sensors for detecting a rumble strip RS in the road 14. For example, a rumble strip sensing device 62FL, 62FR, 62RL or 62RR can be associated with each of the wheels 38FL, 38FR, 38RL and 38RR, respectively, to detect tire engagement with the rumble strips RS which are shown, for example, in FIG. 3. The rumble strip sensing devices 62FL, 62FR, 62RL or 62RR can include, for example, wheel speed sensors, vibration sensors or any other suitable type of sensor as known in the art. In this example, each rumble strip sensing device 62FL, 62FR, 62RL or 62RR can be mounted to unsprung mass devices of the host vehicle 10 that are near each of the wheels 38FL, 38FR, 38RL and 38RR, respectively, or in any other suitable manner as understood in the art. The signals from the rumble strip sensing device 62FL, 62FR, 62RL or 62RR are provided to the controller 34 via, for example, the CAN 36 or in any other suitable manner. The controller 34 can therefore evaluate these signals to determine whether any tires of the host vehicle 10 are in contact with any of the rumble strips RS on the road 14. For example, the rumble strip sensing devices 62FL, 62FR, 62RL and 62RR and the controller 34 can operate as described in Published U.S. Patent Application No. 2011/0285518 entitled "Method for detecting Rumble Strips on Roadways" to determine whether any tires of the host vehicle 10 are in contact with any of the rumble strips RS on the road 14. The entire contents of Published U.S. Patent Application No. 2011/0285518 are incorporated herein by reference. That is, the controller 34 can perform a frequency analysis of a wheel speed signal representing a speed of the vehicle tire 11 to determine whether the vehicle tire 11 is engaging the rumble strip RS. Furthermore, as known in the art, any of the rumble strips RS can be discontinuous in the direction of travel of the road 14, meaning that areas of the road 14 along the path of the rumble strip RS can be without rumble strip indentations such that the areas of the road 14 with rumble strip indentations are spaced in the direction of travel of the road 14. Also, any of the rumble strips RS can be offset in the widthwise direction of the road 14, meaning that at certain locations along the rumble strip RS in the direction of travel of the road 14, the rumble strip indentations are at locations closer to the center of the road 14 that are the rumble strip indentations at other location along the direction of travel of the road 14.

The host vehicle 10 further includes at least one imaging unit 70 that has a picture processing function and preferably includes at least one CCD (Charge Coupled Device) camera, for example, and a camera controller as object recognition sensors for detecting the position of the host vehicle 10 within a driving lane of the road 14 in order to evaluate the location of the host vehicle 10 and the surroundings of the host vehicle 10 as discussed herein. The imaging unit 70 can be configured to pick up an image with a monocular (single-lens) camera composed of a CCD (Charge Coupled Device) camera, for example. The imaging unit 70 is preferably disposed on the front of the host vehicle 10, but can be disposed at any suitable location on the host vehicle 10. Also, multiple imaging units 70 can be disposed at different locations on the host vehicle 10.

Figure 3:
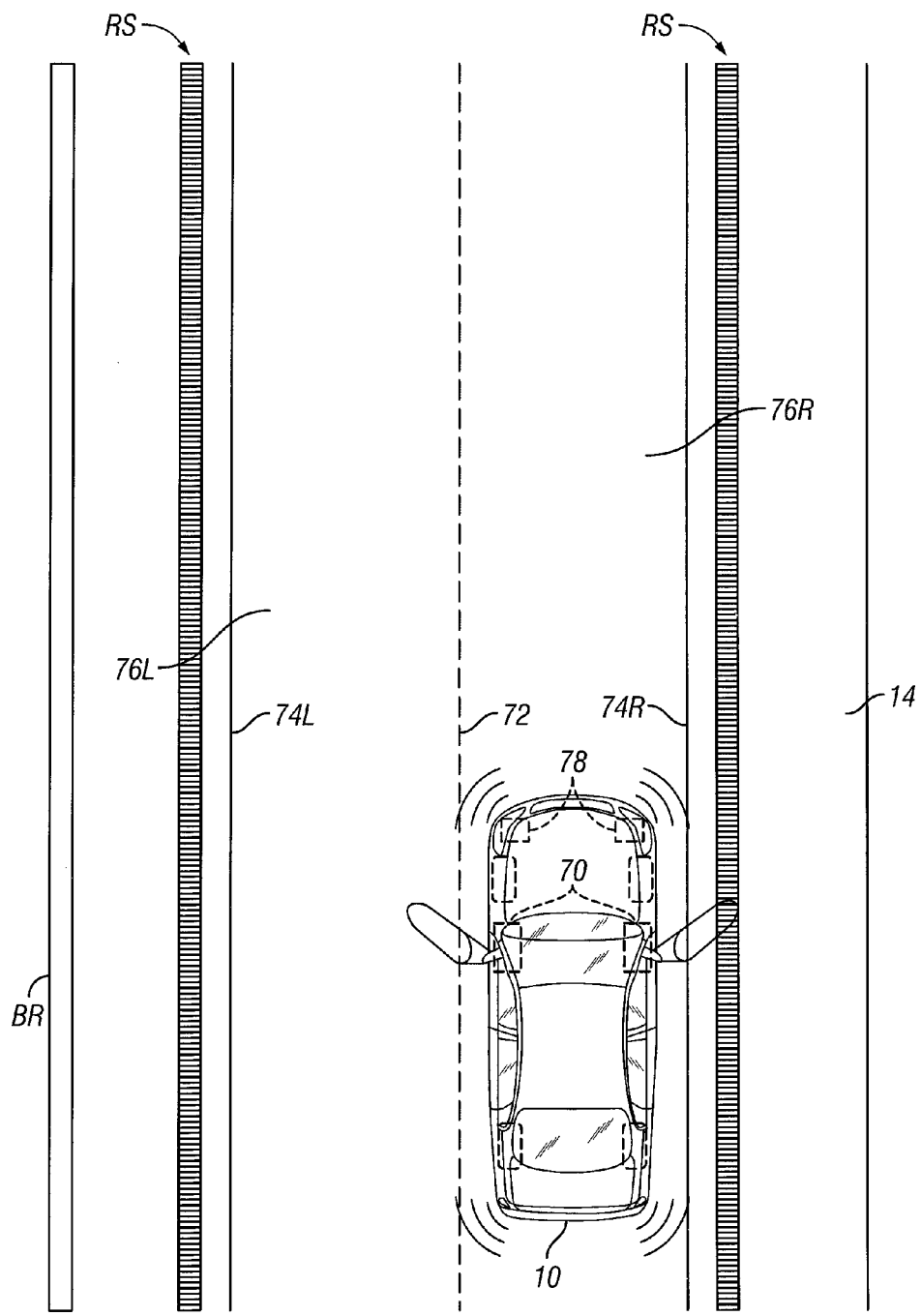
FIG. 3 is a diagrammatic view of the host vehicle shown in FIGS. 1 and 2 traveling along a road.

Thus, the imaging unit 70 provides captured image signals to the controller 34 via, for example, the CAN 36 or in any other suitable manner. The controller 34 can therefore evaluate these signals as discussed herein to determine, for example, the position of the host vehicle 10 on the road 14, the presence of obstacles such as neighboring vehicles 16, and so on. For example, the captured image information can include images of braking lights of neighboring vehicles 16, headlights of approaching neighboring vehicles 16, road signs and so on. Also, the captured image information can include images of a lane line 72 on the road 14, an outside peripheral lane line 74R (right lane line) and an inside peripheral lane line 74L (left lane line) on the road 14, the rumble strips RS, and the presence of a neighboring vehicle 16 as shown in FIG. 3. The controller 34 can therefore ascertain from this image information whether the host vehicle 10 is traveling in the outside peripheral (right) lane 76R or the inside peripheral (left) lane 76L of the road 14, or at any other position on the road 14 as discussed herein. Furthermore, based on the signals from the imaging unit 70, the controller 34 can calculate the angle (yaw angle) formed by the driving lane 76R or 76L of the host vehicle 10 and the longitudinal axis of the host vehicle 10, the lateral displacement from the center of the driving lane 76R or 76L, the driving lane curvature, the lane width, and so forth in any manner as understood in the art for the reasons discussed herein.

The host vehicle 10 also includes a detecting-and-ranging system 78, such as a LIDAR (light detection and ranging) system, a RADAR (radio detection and ranging) system, and/or a SONAR (sound navigation and ranging) system, to name a few, that operates to detect a position of neighboring barriers BR, such as walls along the road 14, and neighboring vehicles 16 with respect to the host vehicle 10 as understood in the art. Thus, the detecting-and-ranging system 78 provides information pertaining to these obstacles to the controller 34 via, for example, the CAN 36 or in any other suitable manner. The controller 34 can therefore evaluate this information as discussed herein to determine, for example, the position of the host vehicle 10 on the road 14, the presence of obstacles such as barriers BR, neighboring vehicles 16, and so on. Consistent detection of a stationary object, such as a barrier BR, next to the host vehicle 10 indicates an outer boundary, which enables the controller 34 to determine that the host vehicle 10 is in a peripheral lane of the road 14. For instance, usually the presence of a barrier BR will indicate that the host vehicle 10 is in an inside peripheral lane bordering a lane of opposing traffic, such as the left lane 76L as shown in FIG. 3. Also, consistent detection of the absence of objects next to the host vehicle 10 typically indicates that the host vehicle 10 is in the outside peripheral lane, which in this example is the right lane 76R as shown in FIG. 3.

The host vehicle 10 further includes a navigation unit 80 that is configured and arranged to output road information to the controller 34. Preferably, the navigation unit 80 communicates with the communication network 20, such as the terrestrial wireless communication devices 22 and satellite communication devices 24 as shown in FIG. 1, to receive GPS information, mapping information, traffic information, accident information and so on. The navigation unit 80 provides navigation information to the controller 34 via, for example, the CAN 36 or in any suitable manner. The controller 34 can thus use this information to determine the location of the host vehicle 10, and the pattern of the road 14 including the locations of intersections, the locations of exits, the type of the road, such as the number of lanes and whether the road 14 is an ordinary road or an expressway, and so on.

The host vehicle 10 also includes a road condition determination unit 82 that is configured and arranged to determinate a road condition based on various inputs from vehicle sensors (not shown) and/or the navigation unit 70. For example, the road condition determination unit 82 can determine based on, for example, signals from the vehicle wipers (not shown) whether the road is wet due to rain and the general intensity of the rain based on the speed of the wipers. The road condition determination unit 82 can also receive signals indicating whether the headlights (not shown) of the vehicle 10 are on, and the intensity of the headlights, which can indicate whether the vehicle 10 is traveling during the day, at night, or in inclement conditions. The road condition determination unit 82 can also determine the traction condition of the road 14 based on, for example, signals received from a traction control device (not shown) on the host vehicle 10 which indicate whether the vehicle tires are having difficulty in maintaining traction with the road 14. The road condition determination unit 82 can further receive signals from the vehicle thermometer (not shown) which can indicate whether the road 14 may be experiencing snow or freezing conditions. The road condition determination unit 82 provides all of this information to the controller 34 via, for example, the CAN 36 or in any suitable manner. The controller 34 can thus use this information to determine the travel conditions of the host vehicle 10 on the road 14 as discussed herein.

The host vehicle 10 further includes a vehicle communication device 84, such as a dedicated short range communications (DSRC) device, that enables the host vehicle 10 to communicate with, for example, neighboring vehicles 16 or terrestrial communication devices 22. Therefore, the host vehicle 10 can share the information pertaining to the host vehicle 10, GPS information, road condition information and so on with neighboring vehicles 16, and the neighboring vehicles 16 can share their respective information with the host vehicle 10 and other neighboring vehicles 16 for purposes discussed herein. Furthermore, the host vehicle 10 and the neighboring vehicles 16 can share this information with a the communication network 20 which can, for example, store this information in a database or provide this information for access by other vehicles that may be traveling over the same road 14 in the recent future, so that a controller 34 in those vehicles can assess traffic conditions, road conditions and so on.

In addition, the host vehicle 10 includes a passenger compartment imaging unit 86 that can capture, for example, movement by the driver such as facial gestures, eye movements, hand movements and so on which can indicate the driver's intent. For example, a driver will typically check the rear view mirror and side view mirror before steering the host vehicle 10 into another lane. The passenger compartment imaging unit 86 provides information representing the captured passenger compartment images to the controller 34 via, for example, the CAN 36 or in any suitable manner. The controller 34 can thus use this information to determine the intent of the driver of the host vehicle 10 for reasons discussed herein.

The host vehicle 10 can also include features that are typically present in a vehicle, such as a cruise control system 88 and an entertainment system including, for example, a display 90, an audio system 92 and user controls 94 such as a keypad, microphone and other types of interface devices as understood in the art. The controller 34 can communicate with the cruise control system 88, the display 90, the audio system 92 and the user controls 94 via, for example, the CAN 36 or in any suitable manner for purposes as discussed herein.

Examples of operations that can be performed by the vehicle controlling system 12 will now be described with reference to FIGS. 4 through 19. It should be noted that certain steps of the operations discussed herein with regard to, for example, FIGS. 5 through 7, can be performed simultaneously or in any suitable order, and need not be performed in the specific order shown.

Figure 4:
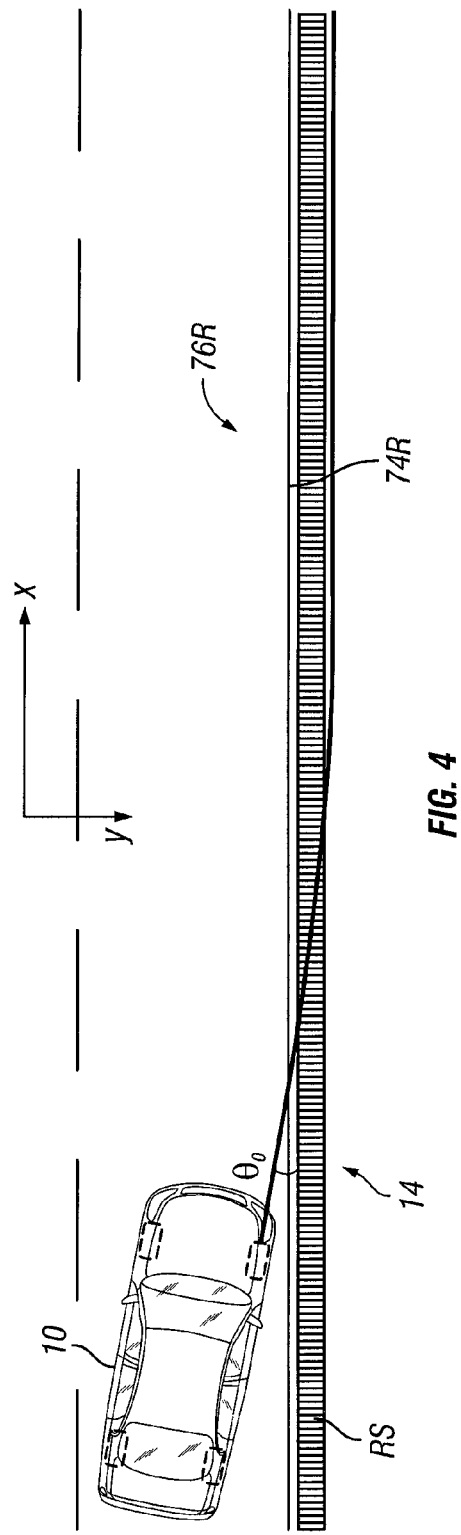
FIG. 4 is a diagrammatic view of the host vehicle shown in FIGS. 1 and 2 having at least one tire that is engaging a rumble strip in the road.

As shown, for example, in FIG. 4, when the host vehicle 10 begins to travel in a direction that may cause the host vehicle 10 to leave the road 14, the front passenger side tire 38FR (11) of the host vehicle 10 will approach the rumble strip RS at an initial angle of attack $\theta_0$, which represents the angle between the path of the front passenger side tire 38FR (11) and a line tangent to the rumble strip RS. The controller 34 can thus perform the operations as shown, for example, in FIGS. 5 through 7.

That is, as the operations begin in step 100, the controller 34 can determine in step 110 whether any of the vehicle tires have engaged any of the rumble strips RS. That is, the controller 34 can monitor the signals provided by the rumble strip sensing devices 62FL, 62FR, 62RL or 62RR to determine, for example, in the manner discussed above and in Published U.S. Patent Application No. 2011/0285518, whether any of the vehicle tires have engaged a rumble strip RS of the road 14. Alternatively or in addition, the controller 34 can monitor signals provided by the imaging unit 70, the detecting-and-ranging system 78, the navigation unit 80, the vehicle communication device 84, or any combination of these signals to determine or estimate the position of the host vehicle 10 on the road 14.

In the example shown in FIG. 4, the front passenger side tire 11 will begin to engage the rumble strip RS outside of the outside peripheral lane line 74R at an initial angle of attack $\theta_0$, which can also be referred to as the heading angle $\theta_0$ of the host vehicle 10. Thus, as shown, for example, in FIG. 8, the signal output by the rumble strip sensing device 62FR can transition from a "+1" level toward a "0" level as the front passenger side tire 11 encroaches on the rumble strip RS to a greater degree. In the example shown in FIG. 8, when the front passenger side tire 11 is positioned at the lateral center of the rumble strip RS, the rumble strip sensing device 62FR outputs a "0" level signal. Then, if the front passenger side tire 11 begins to cross over the rumble strip RS toward the outside edge of the rumble strip RS (e.g., further beyond the outside peripheral lane line 74R), the signal output by the rumble strip sensing device 62FR can transition from a "0" level toward a "−1" level. Accordingly, the controller 34 can monitor whether the front passenger side tire 11 has crossed the rumble strip RS for purposes discussed herein.

As can be appreciated by one skilled in the art, the controller 34 can estimate the initial heading angle $\theta_0$ based on, for example, signals provided by the rumble strip sensing devices 62FL, 62FR, 62RL or 62RR, the imaging unit 70, the detecting-and-ranging system 78, the navigation unit 80, the vehicle communication device 84, or any combination of these signals. If the controller 34 is unable to estimate the initial heading angle $\theta_0$ based on signals from the imaging unit 70 (e.g., the surface of the road 14, the rumble strip RS, or both, are obscured by snow or debris), the controller 34 can estimate the initial heading angle $\theta_0$ based on the amount of time that the vehicle tire 11 remains on the rumble RS when the vehicle tire first crosses the rumble strip RS. That is, the width of a rumble strip RS is typically about 20 cm, and the width may vary within the range of ±5 cm. In any event, the controller 34 may initially assume that the rumble strip RS has a width of 20 cm, and estimate the heading angle $\theta_0$ based on this width. The controller 34 can also correct the initial estimate of the heading angle $\theta_o$ based on, for example, the time that elapses before the vehicle tire 11 begins to reengage the rumble strip RS after the controller 34 begins to perform the steering pulsing control as discussed herein.

Figure 5:
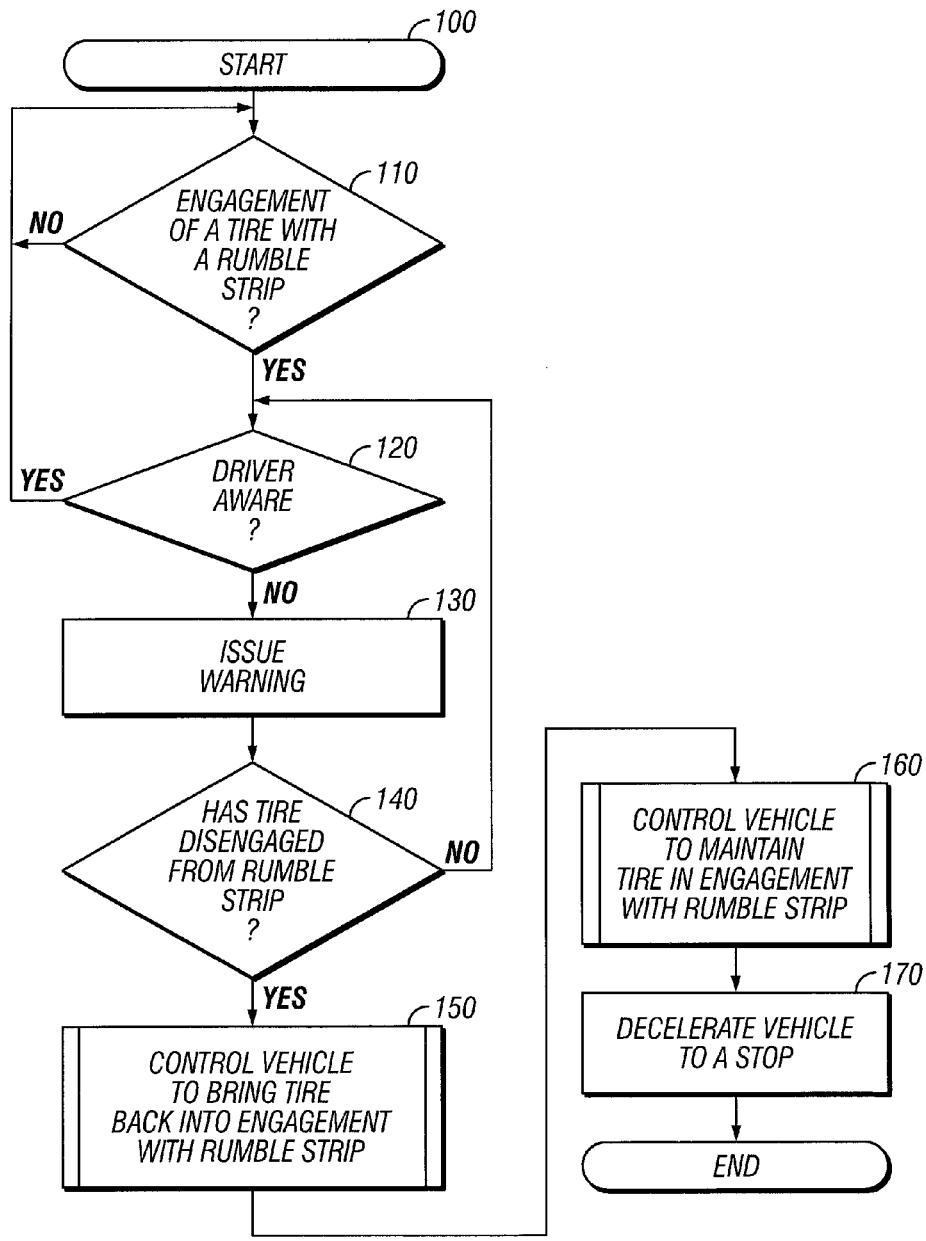
FIG. 5 is a flowchart illustrating an example of operations performed by the vehicle controlling system as shown in FIGS. 1 and 2.

Returning now to the flowchart of FIG. 5, if the controller 34 determines in step 110 that none of the vehicle tires has engaged any of the rumble strips RS, the processing can repeat step 110. However, when the controller 34 determines in step 110 that none of the vehicle tires have engaged any of the rumble strips RS, the processing continues to step 120 during which the controller 34 determines whether the driver of the host vehicle 10 is in an aware state. An "aware state" can mean that the driver is actively controlling the host vehicle 10 or is at least aware of the path of travel of the host vehicle 10. In other words, a determination that the driver is in an aware state indicates a high likelihood that the driver is steering the host vehicle 10 to cross a rumble strip RS. On the contrary, an "unaware state" can mean that the driver of the host vehicle 10 is or may not be aware of the travel path of the host vehicle 10, or may not be in control of the host vehicle 10. In particular, during an unaware state, the driver may not be aware that the host vehicle 10 is beginning to encroach upon a rumble strip RS. Also, during an unaware state, the driver might be aware that the host vehicle 10 is beginning to encroach upon a rumble strip RS but may be in an incapacitated state so that the driver is incapable or only marginally capable of controlling the host vehicle 10.

The controller 34 can determine whether the driver of the host vehicle 10 is in an aware state based on, for example, signals received from the passenger compartment imaging unit 86, the steering system 30, the braking system 32, or any combination of these signals. For example, the controller 34 can analyze signals from the passenger compartment imaging unit representing facial gestures, eye movements, hand movements and so on which can indicate whether the driver is in an aware state. The controller 34 can also analyze signals from the torque sensor 42, steering angle sensor 44, steering motor 46, turn signal switch 48, or any combination of these signals, to determine whether the driver is intentionally turning or steering the host vehicle 10 in a particular direction, thus indicating that the driver is in an aware state. Thus, the controller 34 can detect the driver awareness state by detecting a steering operation of the host vehicle 10 and determining the driver awareness state based on the detected steering operation. The detecting of the steering operation can include detecting whether the steering operation corrects a trajectory of the host vehicle 10. Thus, the controller 34 can determine that the driver awareness state is an aware driver state while the detecting of the steering operation detects that the steering operation corrects the trajectory of the host vehicle 10. Furthermore, the controller 34 can analyze signals from the braking system 32 to determine whether the driver is intentionally braking the host vehicle 10, thus indicating that the driver is in an aware state.

If the processing determines in step 120 that the driver is in an aware state, it is not necessary for the vehicle controlling system 12 to issue a warning or perform any corrective action maneuvers of the host vehicle 10 as discussed herein. Accordingly, the processing can return to step 110 and repeat as discussed above. Thus, the controller 34 detects a driver awareness state of the driver of the host vehicle 10, and refrains from performing the first and second vehicle controls discussed herein while the driver awareness state indicates an aware driver state in which the driver is aware of a position of the host vehicle 10 on the road 14.

However, if the processing determines in step 120 that the driver of the host vehicle 10 is in an unaware state or, in other words, is not in an aware state, the processing continues to step 130. In this example, the controller 34 can perform a warning control operation by controlling the vehicle controlling system 12 to issue a warning to the driver of the host vehicle 10 in step 130 once it has been determined that the driver is not in an aware state and the host vehicle 10 is beginning to drift off of the road 14. For example, the controller 34 can control the vehicle horn, the display 90 and the audio system 92 to issue a visual alert, an audible alert, or both. The controller 34 can also control the steering system 30, for example, to issue a tactile alert to the driver. The controller 34 can perform other operations such as turning on the warning lights of the host vehicle 10 to flash to issue an alert external to the host vehicle 10 and so on. Furthermore, the warning or warnings need not be issued in step 130, but rather, can be issued at other times during the processing as discussed below.

The processing then determines in step 140 whether the vehicle tire that was contacting the rumble strip RS has disengaged from the rumble strip RS. In this example, the processing determines whether the front passenger side tire 11 of the host vehicle 10 has disengaged from the rumble strip RS after crossing the rumble strip RS (e.g. −1 in FIG. 8). For example, the controller 34 can determine from signals provided by the rumble strip sensing device 62FR, the imaging unit 70, the detecting-and-ranging system 78, the navigation unit 80, the vehicle communication device 84, or any combination of these signals as discussed above to determine whether the front passenger side tire 11 has disengaged from the rumble strip RS after crossing the rumble strip RS. Because the host vehicle 10 is travelling toward the rumble strip RS at the angle $\theta_0$, it is likely that the front passenger side tire 11 will cross over the rumble strip RS as shown in FIG. 4, and thus disengage from the rumble strip RS.

If the front passenger side tire 11 of the host vehicle 10 has not disengaged from the rumble strip RS, the processing returns to step 120 and repeats as discussed above. That is, in this situation, the front passenger side tire 11 remains in engagement with the rumble strip RS which indicates that the host vehicle 10 is not travelling off of the road 14. However, if the processing determines in step 140 that the front passenger side tire 11 has disengaged from the rumble strip RS, the processing continues to step 150 to begin controlling movement of the host vehicle 10.

Figure 9:
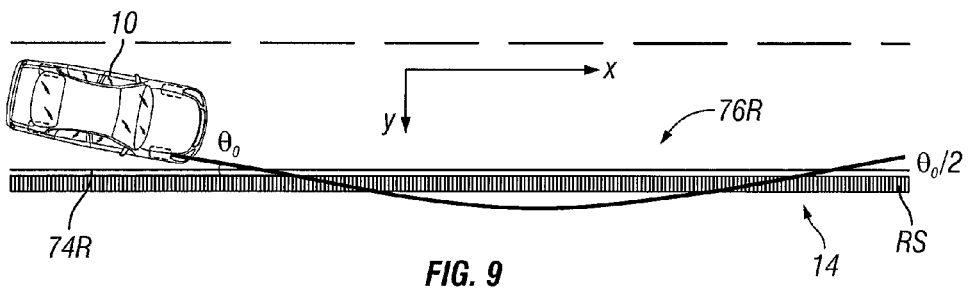
FIG. 9 is a diagrammatic view of the vehicle shown in FIGS. 1 and 2 being controlled so that at least one tire that has disengaged with the rumble strip is brought back into engagement with the rumble strip.

That is, in step 150, the processing performs a first vehicle control by operating the controller 34 to control movement of the host vehicle 10 after the vehicle tire 11 has disengaged from the rumble strip RS to bring the vehicle tire 11 back into engagement with the rumble strip RS. In this example, the controller 34 performs the first vehicle control as a pulse control operation which pulses the steering of the host vehicle 10 to bring at least one of the tires of the host vehicle 10 back into engagement with the rumble strip RS as shown in FIG. 9 so that the controller 34 can further perform tracking control as discussed herein.

Figure 6:
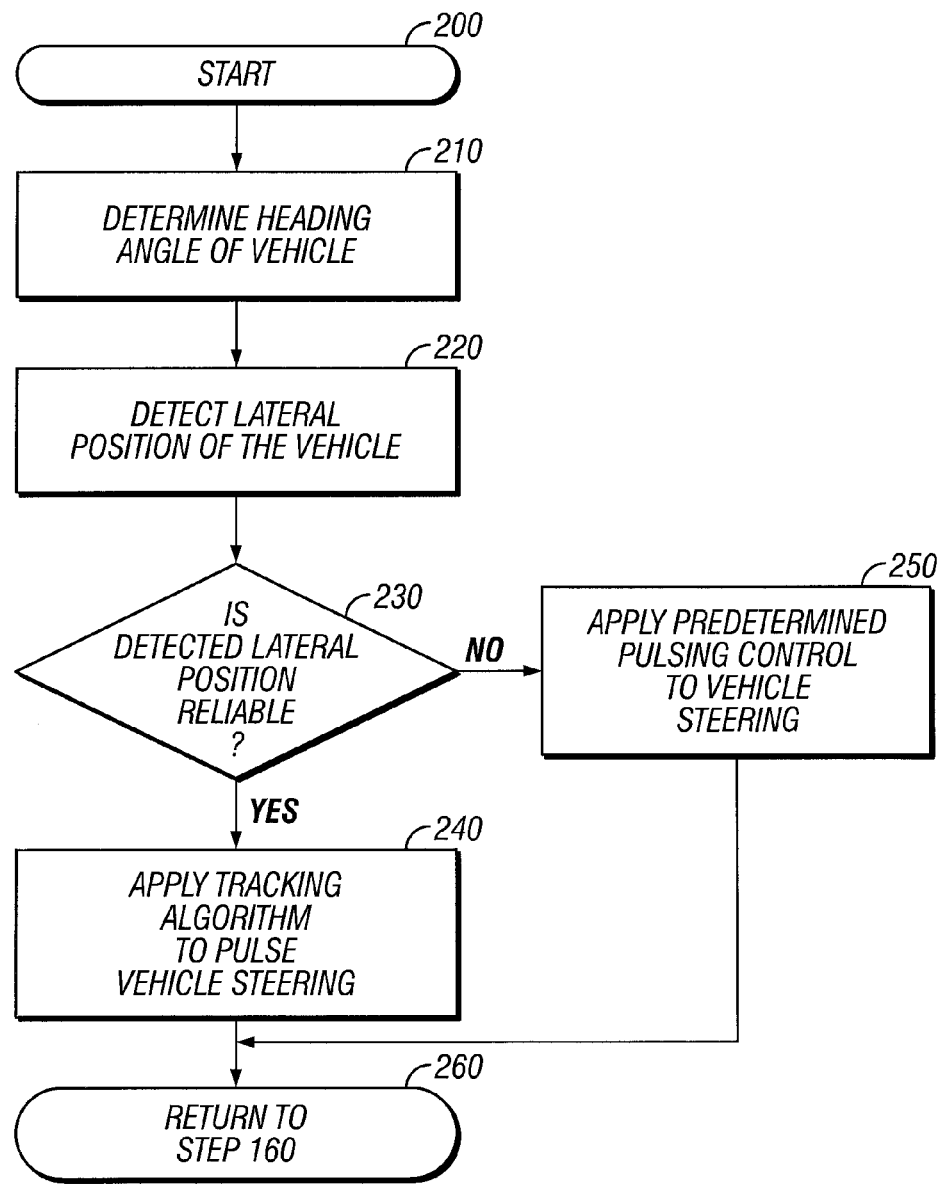
FIG. 6 is a flowchart illustrating an example of details of a first vehicle control operation performed by the vehicle controlling system as shown in FIGS. 1 and 2.

In this example, the controller 34 can perform open-loop steering control to control the steering system 30 to force the host vehicle 10 to return toward the rumble strip RS at a reduced heading angle so at least one tire of the host vehicle 10 engages the rumble strip RS. That is, as shown in the flowchart of FIG. 6, when the first vehicle control begins in step 200, the controller 34 determines the heading angle of the host vehicle 10 in step 210. For example, the controller 34 can receive signals from the imaging unit 70, the detecting-and-ranging system 78, the navigation unit 80, the vehicle communication device 84, or any combination of these signals as discussed above to determine the heading angle $\theta_0$ at which the host vehicle 10 was approaching the rumble strip RS as discussed above. Furthermore, in step 220, the controller 34 can receive signals from the imaging unit 70, the detecting-and-ranging system 78, the navigation unit 80, the vehicle communication device 84, or any combination of these signals as discussed above to determine the lateral position of the host vehicle 10.

The controller 34 then determines in step 230 whether the detected lateral position of the host vehicle 10 is believed to be reliable. For example, the controller 34 can evaluate the signals from each of the imaging unit 70, the detecting-and-ranging system 78, the navigation unit 80, and the vehicle communication device 84 to determine whether those signals accurately provide information that can be used to determine the lateral position of the host vehicle 10. That is, the controller 34 can determine whether the signals from the imaging unit 70 representing the surface of the road 14 accurately represent the positions of the lane lines 72, rumble strips RS, and so on that are on the road 14. If the controller 34 cannot accurately ascertain the positions of the lane lines 72, rumble strips RS and so on that are the surface of the road 14 because, for example, the lane lines 72 are worn, covered with debris or snow, because the imaging unit 70 is not operating properly, or for any other reason, the controller 34 can determine that the signals provided by the imaging unit 70 are not reliable. Similarly, if the controller 34 cannot accurately interpret the signals received by the detecting-and-ranging system 78, the navigation unit 80, and/or the vehicle communication device 84, the controller 34 can determine that those signals are unreliable. If the controller 34 determines that enough of the information provided by the signals from the imaging unit 70, the detecting-and-ranging system 78, the navigation unit 80, and the vehicle communication device 84 cannot be accurately ascertained, the controller 34 can determine that the detected lateral position of the host vehicle 10 is not reliable. Alternatively, if the controller 34 determines that enough of the signals from the imaging unit 70, the detecting-and-ranging system 78, the navigation unit 80, and the vehicle communication device 84 readily represent the information they are intended to represent (e.g., the lane lines 72 on the road 14), the controller 34 can determine that the detected lateral position of the host vehicle 10 is reliable.

If the controller 34 determines that the detected lateral position of the host vehicle 10 is believed to be reliable, the processing continues to step 240 where controller 34 can control the pulsing of the steering system 30 in accordance with a tracking algorithm. As discussed above, since it is likely that the vehicle tire 11 will have crossed over the rumble strip RS, the controller 34 will control pulsing of the steering to reverse the direction of lateral motion of the host vehicle as shown in FIG. 9. Also, in this example, the controller 34 can pulse the steering so that the vehicle tire 11 reengages the rumble strip RS at an angle that is smaller than the heading angle $\theta_0$ at which the vehicle tire 11 first engaged the rumble strip RS. For instance, as shown in FIG. 9, the pulsing of the steering can reduce the heading angle $\theta_0$ by a factor of 2, so that the vehicle tire 11 reengages the rumble strip at an angle $\theta_0/2$ as shown in FIG. 9. Naturally, the controller 34 can control the pulsing of the steering so that the vehicle tire 11 reengages the rumble strip RS at any suitable angle which can be determined, for example, based on the curvature of the road 14, the velocity at which the host vehicle 10 is travelling, and so on.

Accordingly, the first vehicle control includes determining a first heading angle $\theta_0$ of the host vehicle 10 with respect to the rumble strip RS, and controlling the movement of the host vehicle 10 after the vehicle tire 11 has disengaged from the rumble strip RS to bring the vehicle tire 11 back into engagement with the rumble strip RS at a second heading angle $\theta_0/2$ of the host vehicle 10, different than the first heading angle $\theta_0$, with respect to the rumble strip RS. As indicated above, the second heading angle $\theta_0/2$ is less than the first heading angle $\theta_0$. Furthermore, the first vehicle control includes determining when the vehicle tire 11 disengages from the rumble strip RS after crossing the rumble strip RS and controlling the movement of the host vehicle 10 after the vehicle tire 11 has crossed the rumble strip RS to change a lateral direction of movement of the host vehicle 10 to bring the vehicle tire 11 back into engagement with the rumble strip RS.

Figure 10:
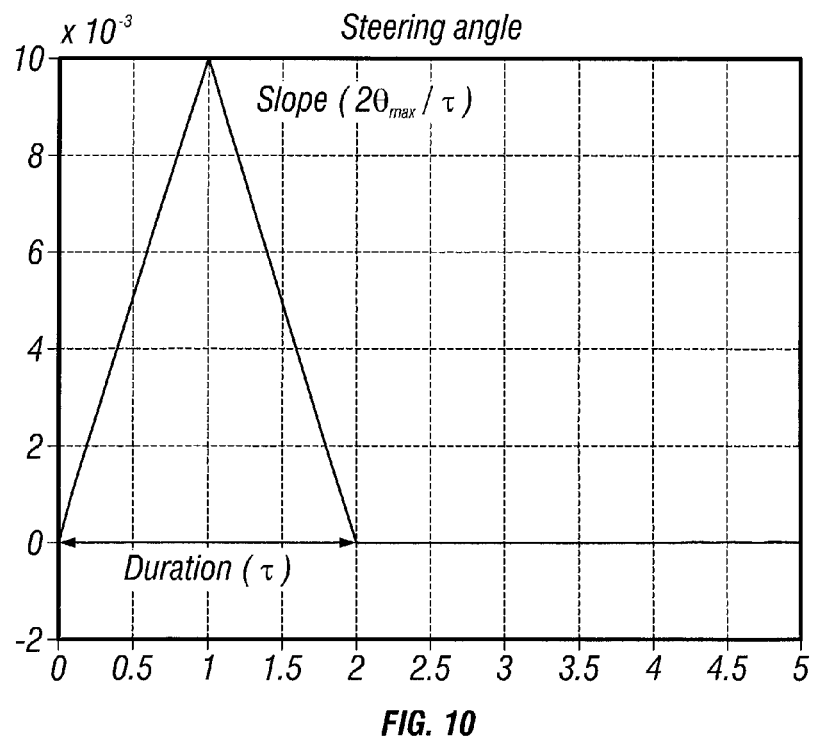
FIG. 10 is a graph illustrating an example of a steering pulse control signal performed during the first vehicle control as shown in FIGS. 5 and 6.

An example of the pulsing with respect to the steering angle of the host vehicle 10 is demonstrated in FIGS. 10 through 14. That is, as shown in FIG. 10, the controller 34 can apply a triangular steering pulse to the steering system 30. Each steering pulse can have a duration ($\tau$) and a slope ($2\theta_{max}/\tau$). Thus, the controller 34 pulses the steering so that the vehicle tire 11 of the host vehicle 10 will return to the rumble strip RS at a reduced heading angle $\theta_0$ as discussed above.

Figure 11:
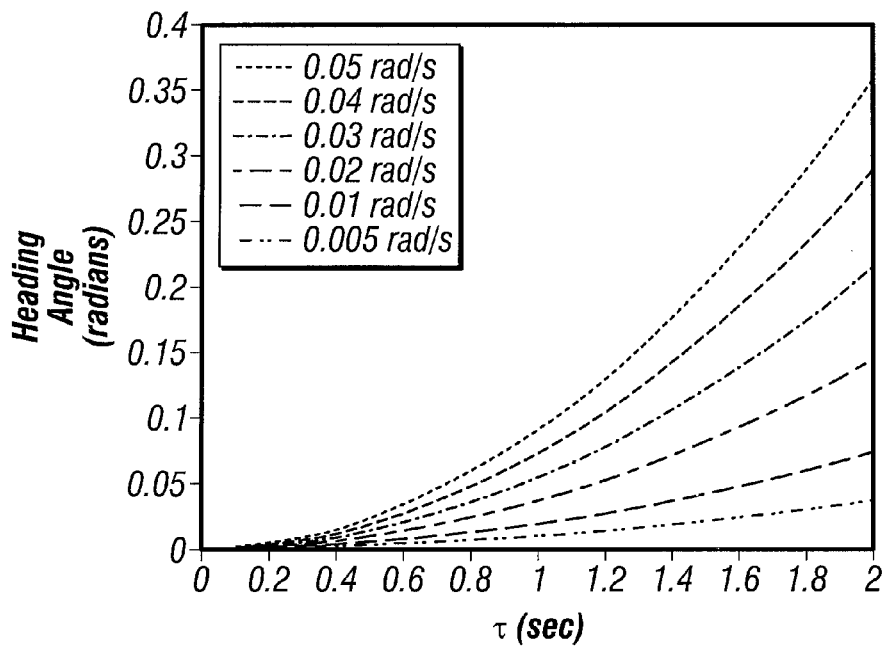
FIG. 11 is a graph illustrating an example of changes in values of the steering pulse control signal shown in FIG. 10 in relation to the values of change of duration for several values of slope of the steering pulse control signal.
Figure 12:
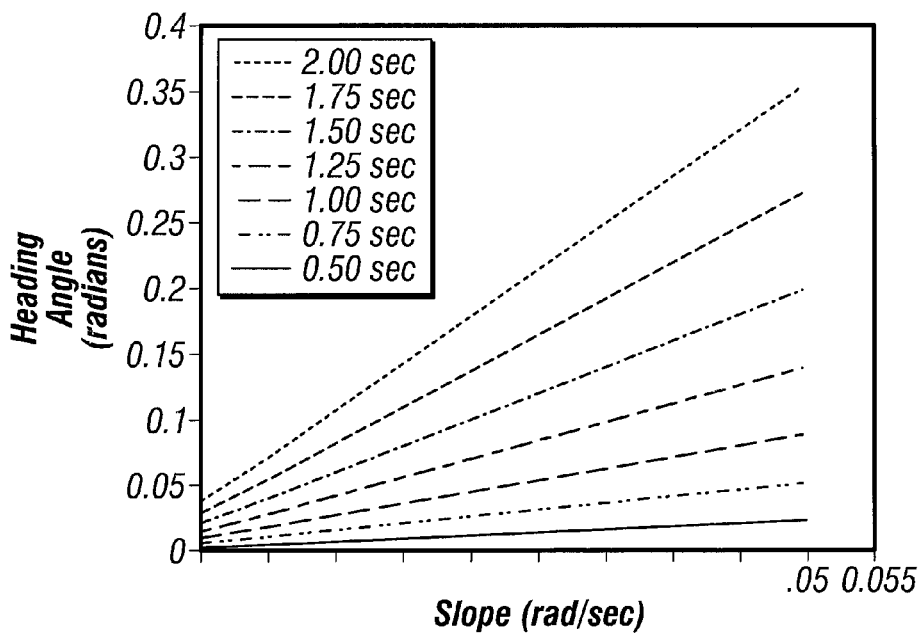
FIG. 12 is a graph illustrating an example of changes in values of the steering pulse control signal shown in FIG. 10 in relation to the values of change of slope for different values of duration of the steering pulse control signal.

FIGS. 11 and 12 illustrate that changes to the duration ($\tau$) and the slope ($2\theta_{max}/\tau$) of each steering pulse can affect a change in the heading angle $\theta_0$ of the host vehicle 10. For instance, as shown in FIG. 11, for several values of slope, the values of the duration $\tau$ were swept from 0.1 sec to 2 sec and the values of change of heading angle $\theta_0$ of the host vehicle 10 were obtained. FIG. 11 shows the relationship between a change in heading angle versus duration $\tau$ for different values of a slope of the steering pulse. As indicated, the change in heading angle $\theta_0$ of the host vehicle 10 increases smoothly in relation to an increasing steering pulse duration $\tau$.

Similarly, for several values of duration $\tau$, the values of slope were swept from 0.005 rad/sec to 0.05 rad/sec and the values of change of heading angle were obtained as shown in FIG. 12. That is, FIG. 12 shows an exemplary relationship between a change in heading angle $\theta_0$ of the host vehicle 10 versus the slope of the steering pulse for different values of duration $\tau$ of the steering pulse. As indicated in this example, the change in heading angle of the host vehicle 10 increases linearly in relation to an increasing slope of the steering pulse.

The value of the duration $\tau$ can be chosen based on the desired range in the change of heading angle of the host vehicle 10 and the desired response time of the steering of the host vehicle 10. For example, a duration $\tau$ equal to 1 second can be chosen, which can provide a change in heading angle (in radians) for the host vehicle 10 equal to 1.773 times the slope of the steering pulse. In other words, Change in steering angle=1.773×slope of steering pulse.

Figure 13:
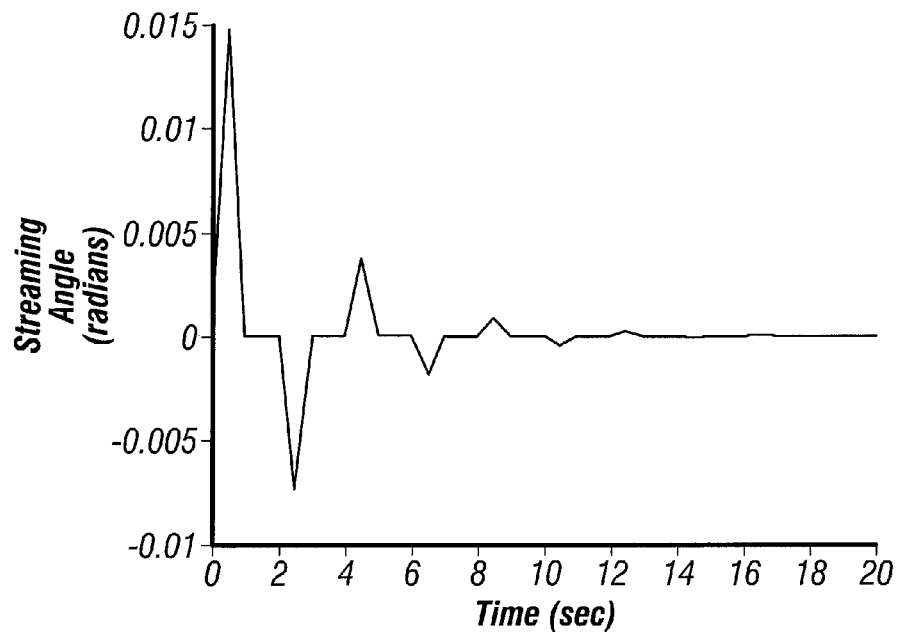
FIG. 13 is a graph illustrating an example of the steering angle of the host vehicle over time as the steering is being controlled in accordance with the first control as shown in FIGS. 5 and 6.
Figure 14:
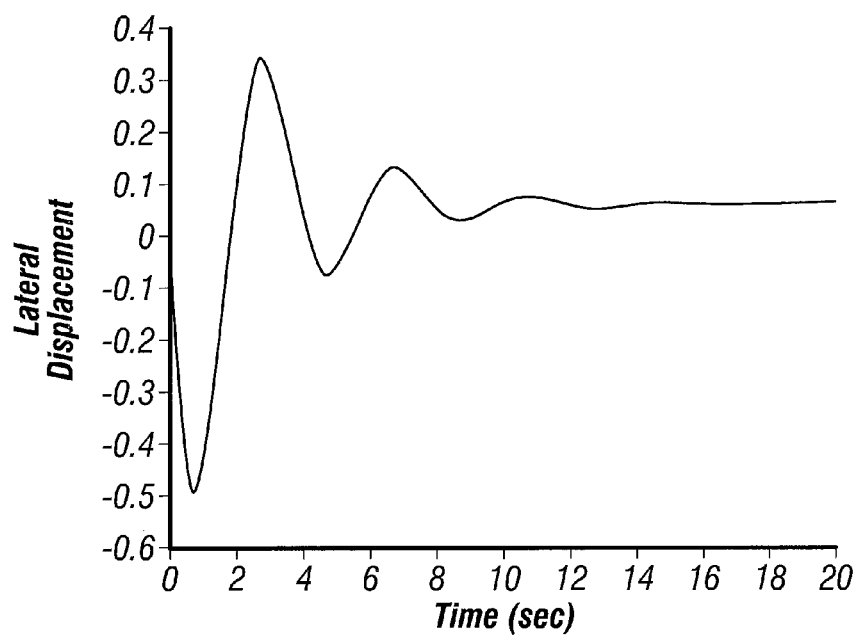
FIG. 14 is a graph illustrating an example of the lateral displacement of the host vehicle over time as the steering is being controlled in accordance with the first control as shown in FIGS. 5 and 6.

Hence, in this example, the controller 34 can provide a steering pulse having a duration $\tau$ of 1 second and slope equal to the desired change in the heading angle of the host vehicle 10 divided by 1.773. Accordingly, by providing multiple steering pulses, and halving the steering angle of the host vehicle 10 each time, the controller 34 can perform tracking control of the host vehicle 10 as shown in FIGS. 13 and 14 so that the tire 11 of the host vehicle 10 reengages the rumble strip RS and remains engaged with the rumble strip RS.

Upon performing the above operations, the processing can return to step 160 shown in FIG. 5 and perform a second vehicle control as discussed herein. However, concerning the decision made in step 230 of FIG. 6, if the controller 34 determines that the detected lateral position of the host vehicle 10 is not reliable, the processing continues to step 250 instead of step 240 as discussed above. Hence, the controller 34 will provide a predetermined steering pulse control to the steering system 30 to control the steering of the host vehicle 10. Afterward, the processing continues to step 260 and returns to step 160 shown in FIG. 5. Accordingly, as can be appreciated from steps 230 through 250, the controller 34 can determine the reliability of a detected lateral position of the host vehicle 10 with respect to the rumble strip RS, apply a tracking algorithm as the pulsing when the detected lateral position is determined to be reliable, and apply a predetermined pulse as the pulsing when the detected lateral position is determined to be unreliable.

As will now be discussed with regard to step 160, the processing will perform a second vehicle control by operating the controller 34 to continue to control movement of the host vehicle 10 to maintain the vehicle tire 11 in engagement with the rumble strip RS after the vehicle tire 11 has been brought back into engagement with the rumble strip RS by the first vehicle control as discussed above. This second vehicle control can be, for example, a sliding control as understood in the art.

Figure 15:
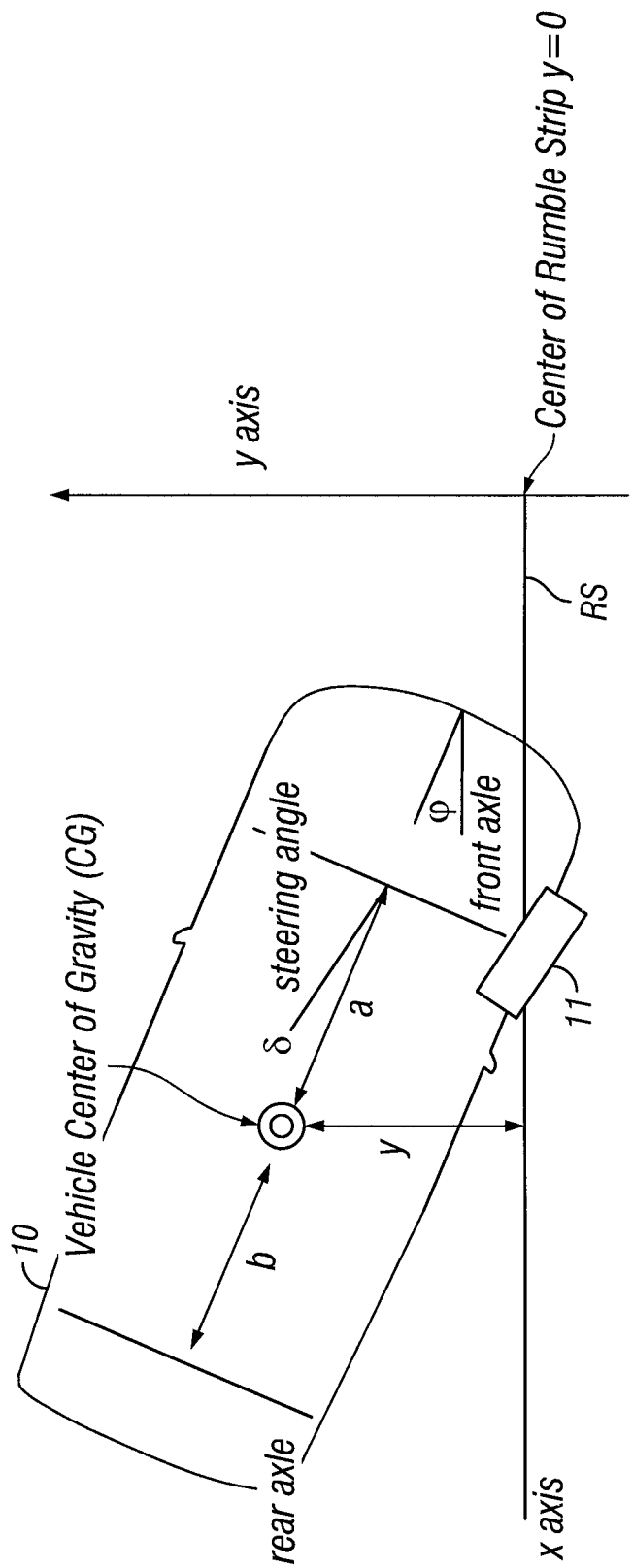
FIG. 15 is another diagrammatic view of the host vehicle shown in FIGS. 1 and 2 in relationship to a rumble strip in the road.

That is, FIG. 15 illustrates an example of the position of the host vehicle 10 as the vehicle tire 11 engages the rumble strip RS. The controller 34 can perform a type of sliding control in accordance with a linear bicycle handling model as known in the art. The model in this example has four state variables and one control input, and small angles are assumed. The parameters shown in FIG. 15, as well as those used in the equations below, are as follows $x_1=y$: Lateral displacement of the center of gravity (CG) of the host vehicle 10 relative to the rumble strip RS (in units of meters m);

$y=0$: Corresponds to the front right vehicle tire 38FR (11) tracking the edge or center of the rumble strip RS;

$x_2=v$: Lateral velocity of CG relative to the vehicle (in units of meters per second m/s);

$x_3=\varphi$: Vehicle yaw angle (in units of radians);

$x_4=r$: Yaw rate (in units of radians per second rad/s);

$\delta$: Steering angle at the front tires of the host vehicle 10 (in units of radians);

a: The distance from the CG of the host vehicle 10 to the front axle of the host vehicle 10 (in units of meters); and b: The distance from the CG of the host vehicle 10 to the rear axle of the host vehicle 10 (in units of meters).

According to the linear bicycle handling model, the state equations are $$\begin{bmatrix} \dot{y} \\ \dot{v} \\ \dot{\varphi} \\ \dot{r} \end{bmatrix} = \begin{bmatrix} 0 & 1 & U & 0 \\ 0 & Y_v/m & 0 & Y_r/m - U \\ 0 & 0 & 0 & 1 \\ 0 & N_v/I_{zz} & 0 & N_r/I_{zz} \end{bmatrix} \begin{bmatrix} y \\ v \\ \varphi \\ r \end{bmatrix} + \begin{bmatrix} 0 \\ Y_\delta/m \\ 0 \\ N_\delta/I_{zz} \end{bmatrix} \delta = A + B\delta$$

where

-continued $$Y_V = -\frac{C_{af} + C_{ar}}{U} \quad N_V = -\frac{aC_{af} - bC_{ar}}{U}$$

$$Y_r = -\frac{aC_{af} - bC_{ar}}{U} \quad N_r = -\frac{a^2C_{af} + b^2C_{ar}}{U}$$

$$Y_\delta = C_{af} \quad N_\delta = aC_{af}$$

and $C_{af}$, $C_{ar}$ are respectively the front and rear cornering stiffnesses.

As understood in the art, lateral acceleration and yaw rate can represent the manner in which steering of the host vehicle 10 is being controlled. Typical output matrices are:

$$\begin{bmatrix} a \\ r \\ y \end{bmatrix} = \begin{bmatrix} 0 & Y_v/m & 0 & Y_r/m - U \\ 0 & 0 & 0 & 1 \\ 1 & 0 & 0 & 0 \end{bmatrix} \begin{bmatrix} y \\ v \\ \varphi \\ r \end{bmatrix} + \begin{bmatrix} Y_\delta/m \\ 0 \\ 0 \end{bmatrix} \delta = C + D\delta$$

The controller 34 controls the steering to force the error in lateral position $e(t)=y(t)-y_d(t)$ of the host vehicle 10 to be zero if possible. In this example, $y_d(t)$ is a desired reference, and it can be assumed that $y_d=0$, which indicates that the vehicle tire 11 is tracking the center or a prescribed edge of the rumble strip RS. The sliding mode control performed by the controller 34 thus makes use of a sliding surface defined by $s(e, \dot{e}, t) = \dot{e} + \lambda e$. Feedback gain is applied to force $s(e, \dot{e}, t) \rightarrow 0$ via the equation $$\delta = \hat{\delta} - K\text{sgn}(s)$$

where K is a feedback gain and $\hat{\delta}$ is the so-called equivalent control predicted to keep the host vehicle 10 on the "sliding surface." That is, when $s(e, \dot{e}, t)=0$ is imposed, the system has a natural stable tendency to converge towards the target state, $(y, \dot{y}) \rightarrow (0,0)$ according to the decay rate $\lambda$, with $$y(t) = y_0 \exp(-\lambda t).$$

Two constants are then chosen, namely, the decay rate and the feedback gain. The equivalent control is determined by differentiating the sliding surface equation s=0 with respect to time, which is sufficient to provide an explicit expression for the control input. The state variables can be represented by the following equations:

$$s(\vec{x}, t) = x_2 + Ux_3 + \lambda x_1$$

$$\dot{s}(\vec{x}, t) = \frac{Y_V}{m}x_2 + \frac{Y_r}{m}x_4 + \frac{Y_\delta}{m}\hat{\delta} + Ux_4 + \lambda(x_2 + Ux_3)$$

$$\hat{\delta} = -\frac{m}{Y_\delta}\left(\left(\frac{Y_V}{m} + \lambda\right)x_2 + \lambda Ux_3 + \left(\frac{Y_r}{m} + U\right)x_4\right)$$

Figure 16:
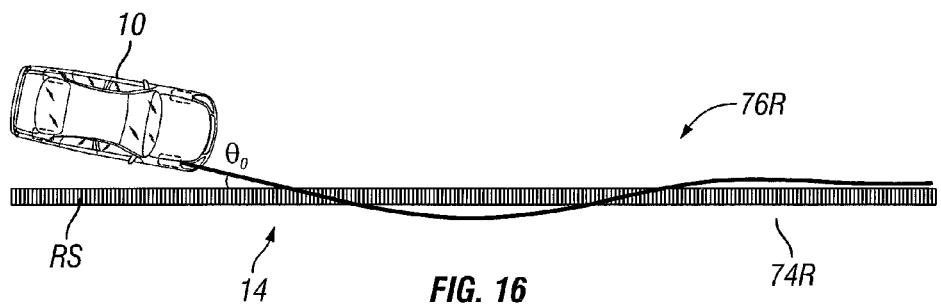
FIG. 16 is a diagrammatic view of the host vehicle shown in FIGS. 1 and 2 being controlled in accordance with the flowcharts shown in FIGS. 5 through 7 such that at least one tire that has engaged and disengaged a rumble strip is being brought back into engagement with the rumble strip.

As an example, when the speed of the host vehicle 10 is U=30 m/s, the heading angle $\theta_0=2°$, K=0.01, $\lambda=2$ s$^{-1}$, the error function tracks the designed sliding surface, which is the desired location of the rumble strip RS, such as an edge or the center of the rumble strip RS, and remains tracking that desired edge or center of the rumble strip RS as shown, for example, in FIG. 16. In this example, the lateral displacement peaks at approximately 0.2 m and settles quickly to follow the rumble strip RS, with the settling time being approximately 2 seconds. The other system states confirm that the response is stable and of acceptable amplitude (for example, the peak lateral velocity of the host vehicle 10 is 0.2 m/s which corresponds to a peak body sideslip angle of approximately 0.4°, and the peak lateral acceleration of the host vehicle 10 is around 2 m/s.

Figure 7:
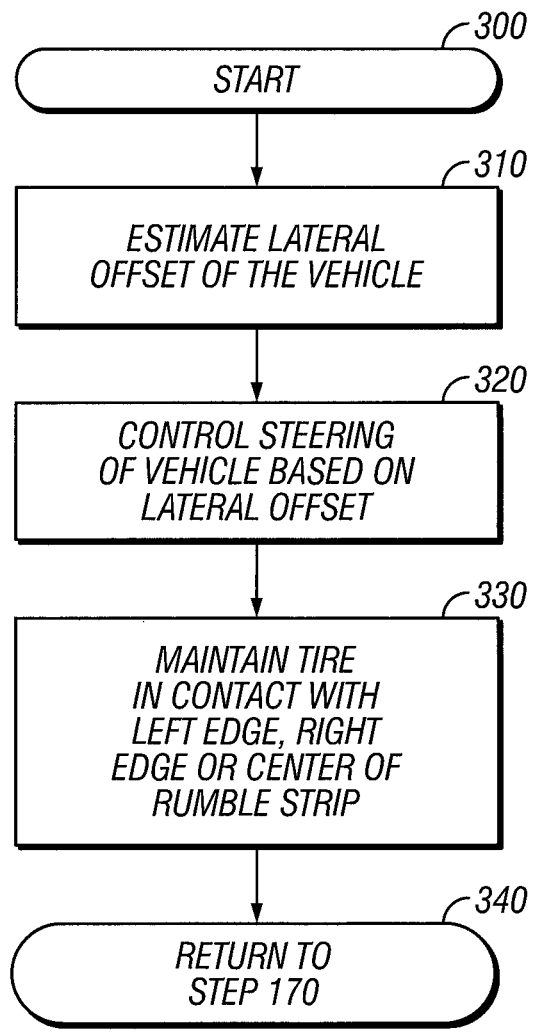
FIG. 7 is a flowchart illustrating an example of details of a second vehicle control operation performed by the vehicle controlling system as shown in FIGS. 1 and 2.
Figure 8:
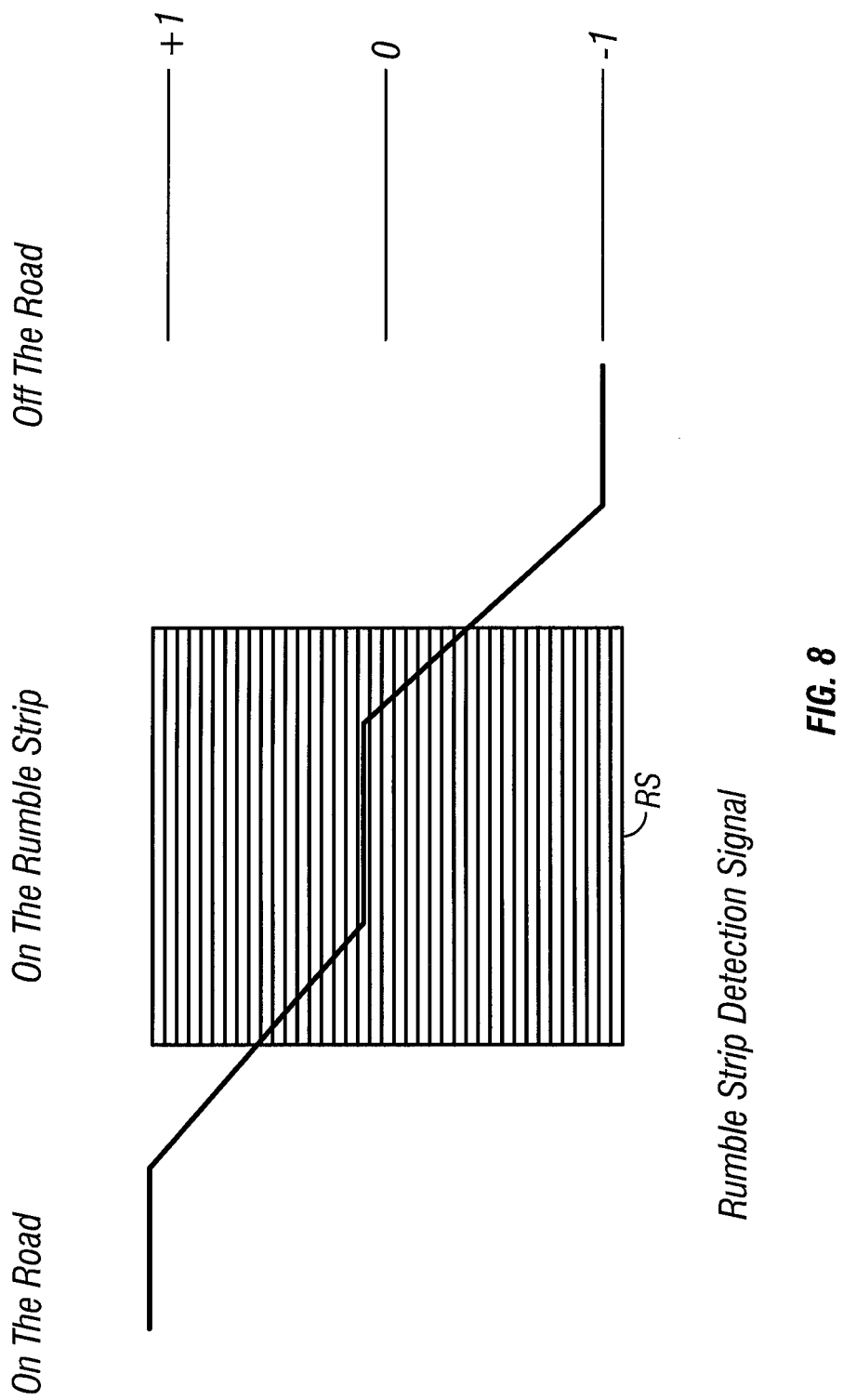
FIG. 8 is a graph illustrating an example of a signal output by a rumble strip detector of the vehicle controlling system as shown in FIGS. 1 and 2.

Accordingly, as can be appreciated from the above, the second vehicle control beginning in step 300 in FIG. 7 includes performing a sliding mode control to control steering of the host vehicle 10. The sliding mode includes estimating a lateral offset of the host vehicle 10 in step 310 based on, for example, a signal from the imaging unit 70, such as a tracking camera, at the host vehicle 10, and controlling steering of the vehicle based on the estimated lateral offset in step 320. Thus, the second vehicle control includes controlling movement of the host vehicle 10 to maintain the vehicle tire 11 along one of an inside edge, an outside edge and a lateral center of the rumble strip RS in step 330. The second vehicle control can further control the movement of the host vehicle 1 to maintain the vehicle tire 11 in substantially full engagement with the rumble strip RS. In step 340, the processing can return to step 170 in FIG. 5.

Figure 17:
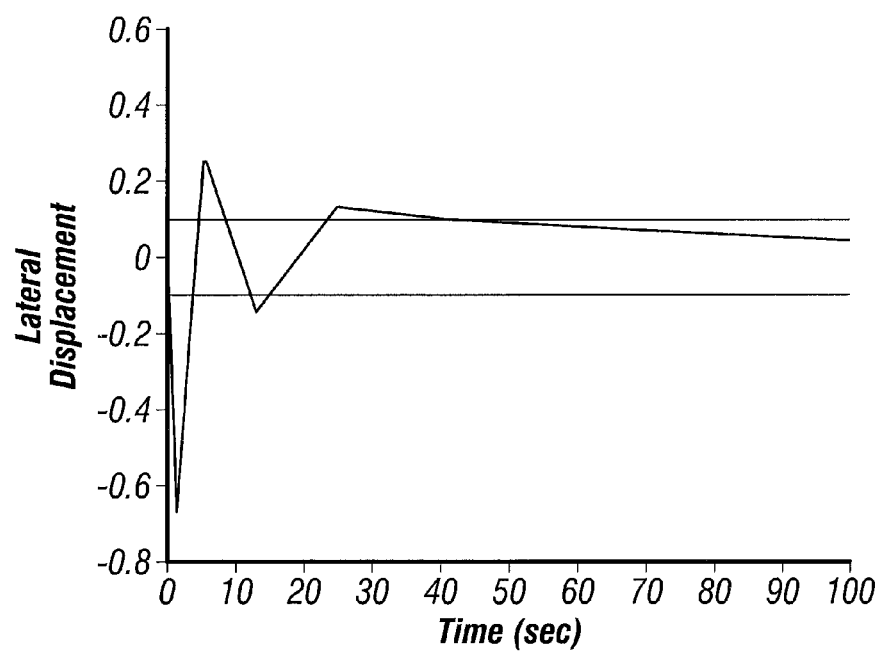
FIG. 17 is a graph illustrating an example of the lateral displacement of the host vehicle over time as the steering is being controlled in accordance with the second control as shown in FIGS. 5 and 7.

In addition, as discussed above with regard to step 250 in FIG. 6, if the lateral position of the host vehicle 10 relative to the rumble RS is unknown or determined to be unreliable, the controller 34 may perform a combination of pulse control and sliding mode control on the vehicle steering. For instance, the controller 34 can operate in pulse control mode to control the steering system 30 by steering pulses as discussed above until the angle of attack $\theta_0$ of the host vehicle 10 is reduced to a sufficiently small value, such as 0.2° or any other suitable value. The controller 34 can then perform the sliding control operations as discussed above. FIG. 17 is an exemplary graphical representation of the lateral displacement of the host vehicle 10 when the steering is controlled by the combined pulse mode/sliding mode control.

Figure 18:
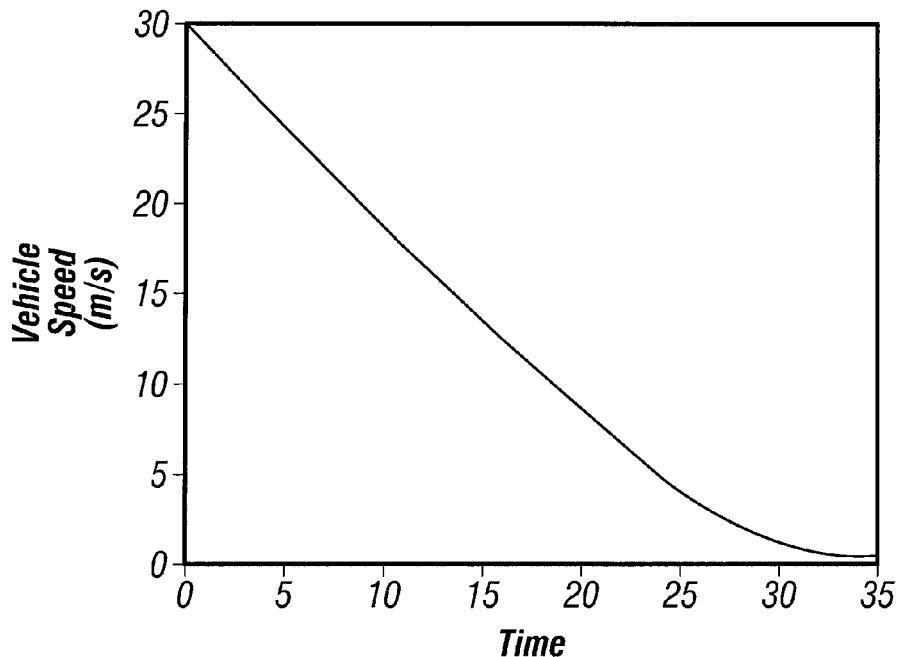
FIG. 18 is a graph illustrating an example of the speed of the host vehicle over time as the deceleration of the host vehicle is being controlled in accordance with the third control as shown in FIG. 5.
Figure 19:
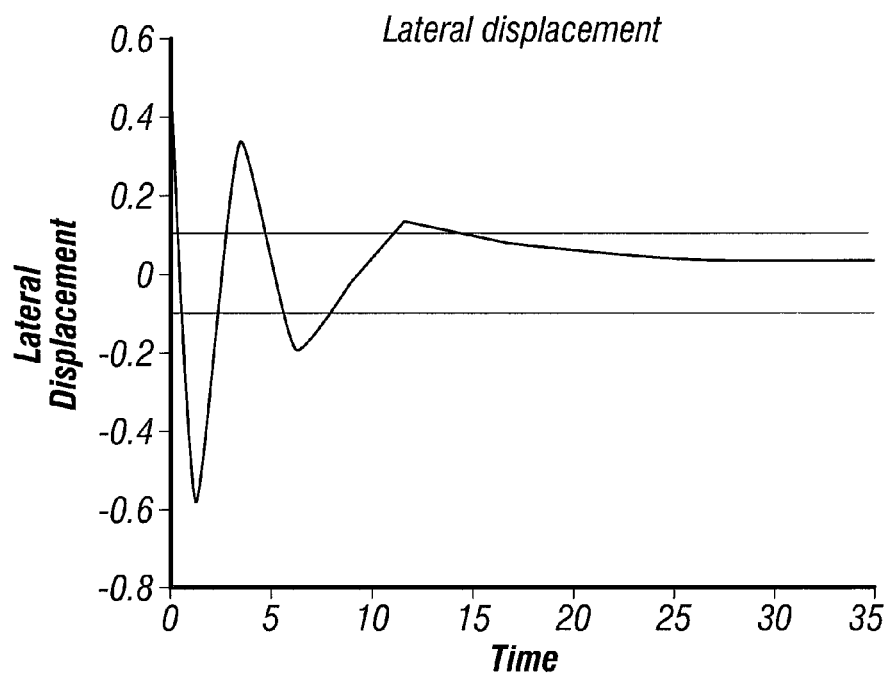
FIG. 19 is a graph illustrating an example of the lateral displacement of the host vehicle over time as the speed of the host vehicle is being controlled as shown in FIG. 18.

Returning to the flowchart is FIG. 5, when the second vehicle control has been performed in step 160 as discussed above with regard to FIG. 7, the controller 34 can perform a third vehicle control by bringing the host vehicle 10 to a stop after performing the first and second vehicle control. That is, the controller 34 can operate the braking system 32 to decelerate the host vehicle 10 to a stop in step 170. As shown in FIGS. 18 and 19, as the host vehicle 10 is decelerated at a rate of 1 m/s$^2$, the amount of lateral displacement of the host vehicle 10 that occurs is very small. Therefore, the controller 34 can maintain the vehicle tire 11 in engagement with an edge or the center of the rumble strip RS while controlling deceleration of the host vehicle 10 to a stop.

Furthermore, as mentioned above, the controller 34 can perform a warning control operation as discussed above with regard to step 130 at any appropriate time during the processing as shown in the flowchart in FIG. 5. That is, instead of or addition to performing the warning control operation in step 130 after determining whether the driver is aware, the controller 34 can perform any or all of the warning operations discussed above after steps 140, 150, 160 or 170. Furthermore, the controller 34 can begin to perform the warning operation in step 130 to provide some or all of the warnings, and then continue to perform the warning operation throughout the processing of steps 140, 150, 160 and 170 to provide some or all of the warnings as discussed above. The controller 34 can also discontinue some or all of the warning operations before or after any of the steps 140, 150, 160 and 170, and then can resume any or all of the warning operations before or after any of the steps 140, 150, 160 and 170.

Accordingly, as can be appreciated from the above, the vehicle controlling system 12 is capable of detecting an engagement of a vehicle tire 11 of a host vehicle 10 with a rumble strip RS of the road 11, determining whether the driver of the host vehicle 10 is in an aware state, and performing first and second vehicle controls to bring the vehicle tire 11 back into engagement with the rumble strip RS and maintain the engagement. The vehicle control system 12 can further issue warnings to the driver and external to the host vehicle 10, and can bring the host vehicle 10 to a stop with at least one of the vehicle tires 11 remaining in engagement with the rumble strip RS.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle controlling method comprising:
    detecting an engagement of a vehicle tire with a rumble strip of a road;
    performing a first vehicle control by operating a controller to control movement of the vehicle after the vehicle tire has disengaged from the rumble strip to bring the vehicle tire back into engagement with the rumble strip; and
    performing a second vehicle control by operating the controller to continue to control movement of the vehicle to maintain the vehicle tire in engagement with the rumble strip after the vehicle tire has been brought back into engagement with the rumble strip.

2. The vehicle controlling method according to claim 1, wherein
    the detecting includes performing a frequency analysis of a wheel speed signal representing a speed of the vehicle tire to determine whether the vehicle tire is engaging the rumble strip.

3. The vehicle controlling method according to claim 1, further comprising
    detecting a driver awareness state of a driver of the vehicle; and
    operating the controller to refrain from performing the first and second vehicle control while the driver awareness state indicates an aware driver.

4. The vehicle controlling method according to claim 3, wherein
    the detecting of the driver awareness state includes detecting a steering operation of the vehicle and determining the driver awareness state based on the detected steering operation.

5. The vehicle controlling method according to claim 4, wherein
    the detecting of the steering operation includes detecting whether the steering operation corrects a trajectory of the vehicle; and
    the detecting of the driver awareness state determines that the driver awareness state is an aware driver state while the detecting of the steering operation detects that the steering operation corrects the trajectory.

6. The vehicle controlling method according to claim 1, wherein
    the first vehicle control includes pulsing a steering of the vehicle.

7. The vehicle controlling method according to claim 6, further comprising
    determining reliability of a detected lateral position with respect to the rumble strip;
    applying a tracking algorithm as the pulsing when the detected lateral position is determined to be reliable; and
    applying a predetermined pulse as the pulsing when the detected lateral position is determined to be unreliable.

8. The vehicle controlling method according to claim 1, wherein
    the second vehicle control includes performing a sliding mode control to control steering of the vehicle.

9. The vehicle controlling method according to claim 8, wherein
    the sliding mode includes estimating a lateral offset of the vehicle based on a signal from a tracking camera at the vehicle, and controlling steering of the vehicle based on the estimated lateral offset.

10. The vehicle controlling method according to claim 1, wherein
    the second vehicle control includes controlling movement of the vehicle to maintain the vehicle tire along one of an inside edge, an outside edge and a lateral center of the rumble strip.

11. The vehicle controlling method according to claim 1, wherein
    the second vehicle control includes controlling movement of the vehicle to maintain the vehicle tire in substantially full engagement with the rumble strip.

12. The vehicle controlling method according to claim 1, further comprising
    performing a third vehicle control by operating the controller to bring the vehicle to a stop after performing the first and second vehicle control.

13. The vehicle controlling method according to claim 1, further comprising
performing a warning control operation to issue a warning at the vehicle.

14. The vehicle controlling method according to claim 13, wherein
the warning control includes operating a vehicle horn to alert a driver of the vehicle.

15. The vehicle controlling method according to claim 13, wherein
the warning control includes operating a light system of the vehicle to flash to issue an alert external to the vehicle.

16. The vehicle controlling method according to claim 1, wherein
the first vehicle control includes determining a first heading angle of the vehicle with respect to the rumble strip, and controlling the movement of the vehicle after the vehicle tire has disengaged from the rumble strip to bring the vehicle tire back into engagement with the rumble strip at a second heading angle of the vehicle, different than the first heading angle, with respect to the rumble strip.

17. The vehicle controlling method according to claim 16, wherein
the second heading angle is less than the first heading angle.

18. The vehicle controlling method according to claim 1, wherein
the first vehicle control includes determining when the vehicle tire disengages from the rumble strip after crossing the rumble strip and controlling the movement of the vehicle after the vehicle tire has crossed the rumble strip to change a lateral direction of movement of the vehicle to bring the vehicle tire back into engagement with the rumble strip.

19. A vehicle control system comprising:
a detector configured to detect an engagement of a vehicle tire with a rumble strip of a road; and
a controller configured to perform a first vehicle control to control movement of the vehicle after the vehicle tire has disengaged from the rumble strip to bring the vehicle tire back into engagement with the rumble strip, and to perform a second vehicle control to continue to control movement of the vehicle to maintain the vehicle tire in engagement with the rumble strip after the vehicle tire has been brought back into engagement with the rumble strip.

20. The vehicle control system according to claim 19, wherein
the controller is further configured to perform a third vehicle control to bring the vehicle to a stop after performing the first and second vehicle control.

* * * * *